US012576964B1

(12) United States Patent
Poster et al.

(10) Patent No.: US 12,576,964 B1
(45) Date of Patent: Mar. 17, 2026

(54) HELICOPTER PITCH CONTROLS

(71) Applicant: Lockheed Martin Corporation,
Bethesda, MD (US)

(72) Inventors: Zachary Scott Poster, Arlington, TX
(US); William Wolcott, Burleson, TX
(US); Ryan Lee Robinson, Aledo, TX
(US)

(73) Assignee: Lockheed Martin Corporation,
Bethesda, MD (US)

( * ) Notice: Subject to any disclaimer, the term of this
patent is extended or adjusted under 35
U.S.C. 154(b) by 0 days.

(21) Appl. No.: 18/926,193

(22) Filed: Oct. 24, 2024

(51) Int. Cl.
*B64C 27/78* (2006.01)
*B64C 27/10* (2023.01)
*B64C 27/59* (2006.01)

(52) U.S. Cl.
CPC .............. *B64C 27/10* (2013.01); *B64C 27/59*
(2013.01); *B64C 27/78* (2013.01)

(58) Field of Classification Search
None
See application file for complete search history.

(56) References Cited

U.S. PATENT DOCUMENTS

| | | | | |
|---|---|---|---|---|
| 1,843,206 | A | * | 2/1932 | Coffman ............... B64C 11/008 |
| | | | | 416/61 |
| 1,994,143 | A | * | 3/1935 | Martens .................. B64C 11/36 |
| | | | | 416/163 |
| 3,082,826 | A | * | 3/1963 | Doman .................... B64C 27/54 |
| | | | | 416/102 |
| 4,952,120 | A | | 8/1990 | Aubry et al. |
| 5,011,373 | A | | 4/1991 | Aubry et al. |
| 11,453,487 | B2 | * | 9/2022 | Wittke .................... B64C 11/06 |
| 11,493,121 | B2 | | 11/2022 | Gilliland et al. |

* cited by examiner

*Primary Examiner* — Kayla McCaffrey
(74) *Attorney, Agent, or Firm* — Michael Best &
Friedrich LLP

(57) ABSTRACT

A rotary-wing aircraft may include a rotor system comprising, a gear module including, a servo having an output shaft linearly moveable along a second axis, a rotating pitch change shaft that rotates about the second axis, a pitch change assembly for coupling linear movement of the output shaft to rotational movement of the pitch change shaft, the pitch change assembly including, a flexible rod movable along the second axis, the flexible rod including a first end having a plate fixedly coupled with the output shaft and a second end operably coupled with the pitch change shaft, the second end disposed within the rotating pitch change shaft, and a bearing having a rotational outer surface coupled for rotation with the pitch change shaft and a non-rotating inner surface operably coupled with the flexible rod for linear movement.

20 Claims, 4 Drawing Sheets

HELICOPTER PITCH CONTROLS

STATEMENT REGARDING FEDERALLY SPONSORED RESEARCH OR DEVELOPMENT

This invention was made with U.S. Government support under Agreement No. W911W6-19-9-0005 awarded by the U.S. Army. The Government has certain rights in the invention.

FIELD OF INVENTION

Exemplary embodiments relate to a rotary-wing aircraft, and more particularly, to a pitch change shaft assembly for use with a rotary-wing aircraft.

BACKGROUND

In a rotary wing aircraft, such as a helicopter for example, a tail rotor system converts tail driveshaft rotary power into the aerodynamic forces necessary to control the direction of flight and to counteract main rotor torque.

A tail rotor head system provides a mounting point for connecting a plurality of tail rotor blades to a blade pitch change mechanism. The pitch of the tail rotor blades is controlled by a position of a tail rotor pitch change shaft. The position of the pitch change shaft is controlled by a pitch change servo. When the pitch change servo pulls the pitch change shaft inboard, the pitch beam and the pitch change links twist the tail rotor blades about internal elastomeric bearings to increase the blade pitch. Conversely, when the pitch change servo permits the pitch change shaft to move outboard, the pitch change shaft bearing and the pitch change links twist the tail rotor blades about internal elastomeric bearings to decrease blade pitch. This adjustment in the blade pitch is used to control a turning direction of the aircraft.

The pitch change shaft rotates with and moves linearly within a rotating tail rotor shaft, also commonly referred to as an output gear shaft. A pitch change bearing supports the pitch change shaft within the tail rotor shaft and allows the pitch change shaft and tail rotor shaft to rotate independently of the non-rotating pitch change servo rod. In a typical arrangement, the pitch change shaft bearing outer raceway rotates with the pitch change shaft and the tail rotor shaft, while the inner raceway is non-rotating but moves linearly with the pitch change servo rod.

SUMMARY

One embodiment provides a rotary-wing aircraft including: a main rotor gearbox; a rotor assembly rotatable about a first axis to provide lift; and a secondary rotor system rotatable about a second axis that is substantially perpendicular to the first axis, the secondary rotor system including, a gear module driven by the main rotor gearbox, the gear module including, a servo having an output shaft linearly moveable along a second axis, a rotating pitch change shaft that rotates about the second axis, a pitch change assembly for coupling linear movement of the output shaft to rotational movement of the pitch change shaft, the pitch change assembly including, a flexible rod movable along the second axis, the flexible rod including a first end having a plate fixedly coupled with the output shaft and a second end, the second end disposed within the rotating pitch change shaft, and a bearing having a rotational outer surface coupled for rotation with the pitch change shaft and a non-rotating inner surface operably coupled with the flexible rod for linear movement.

Another embodiment provides a rotor system for use in a rotary-wing aircraft, the rotor system including: a gear module including, a servo having an output shaft linearly moveable along an axis, a rotating pitch change shaft which rotates about the axis, a pitch change assembly for coupling linear movement of the output shaft to rotational movement of the pitch change shaft, the pitch change assembly including, a flexible rod movable along the axis, the flexible rod including a first end having a plate fixedly coupled with the output shaft and a second end operably coupled with the pitch change shaft, and a bearing having a rotational outer surface coupled for rotation with the pitch change shaft and a non-rotating inner surface operably coupled with the flexible rod for linear movement, wherein the bearing is the only bearing in the pitch change assembly.

Another embodiment provides a gear module including: a servo having an output shaft linearly moveable along an axis; a rotating pitch change shaft which rotates about the axis, a pitch change assembly for coupling linear movement of the output shaft to rotational movement of the pitch change shaft, the pitch change assembly including, a flexible rod movable along the axis, the flexible rod including a first end having a plate fixedly coupled with the output shaft by a plurality of fasteners, and a bearing having a rotational outer surface coupled for rotation with the pitch change shaft and a non-rotating inner surface operably coupled with the flexible rod for linear movement, wherein the plate imparts a moment on the output shaft.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Typical pitch change assemblies require multiple bearings to support a rod between a servo and a pitch change shaft. The multiple bearings are typically required on each end of the rod to prevent axial misalignment while changing the pitch of aircraft blades. Including one bearing on each end of the rod prevents axial misalignment due to deflection and tolerance stackup. Such a rod has a large diameter on each end, thereby limiting the size of the bearings by requiring an inner race of the bearing to be big enough receive the outer diameter of the rod to aid in axial misalignment. This drives up the weight of the entire pitch change assembly due to the large sizing of the pitch change shaft, the bearings, and any housing surrounding the pitch change assembly, as defined by the size of the pitch change shaft bearing.

Exemplary embodiments address these issues by providing the required functionality of a pitch change assembly while also eliminating the large size of the bearings that are often used to retain parts together. The pitch change assembly includes a flexible rod with a smaller outer diameter.

With the implementation of a more flexible rod, the pitch change assembly no longer requires multiple bearings. Rather, only one bearing is needed, reducing the number of parts and the weight of the design. With the elimination of the large outer diameter, the remaining bearing is no longer limited by the outer diameter of the flexible rod, thereby allowing for a smaller bearing to be used. The smaller bearing size shrinks the overall system envelope and weight. The reduced number of parts also allows for reduced production cost and reduced development time. As such, the exemplary embodiments described herein provide a light-weight solution, that reduces production costs while also increasing reliability of the system.

Figure 1:
FIG. 1 depicts a perspective view of an example of a rotary wing aircraft.

Shown in FIG. 1 is a schematic view of an embodiment of a rotary wing vertical takeoff and landing (VTOL) aircraft. The aircraft 10 in the disclosed, non-limiting embodiment includes a dual, counter-rotating, coaxial main rotor system 12 supported by an airframe 14 having an extending tail 16. The airframe 14 mounts a secondary rotor system 18. In the illustrated embodiment, the secondary rotor system 18 is a translational thrust system or propulsor system for providing translational thrust (forward or rearward) to the aircraft 10. However, in other embodiments, the secondary rotor system 18 may be an anti-torque system or tail rotor system, such as those used in aircraft having a single main rotor system.

The main rotor system 12 is driven about an axis of rotation A through a main rotor gearbox (MGB) 20 by one or more engines (not shown). The engines generate the power available for flight operations and couples such power to the main rotor system 12 and the secondary rotor system 18 through the MGB 20. The main rotor system 12 includes an upper rotor assembly 11 driven in a first direction (e.g., counter-clockwise) about the main rotor axis A, and a lower rotor assembly 13 driven in a second direction (e.g., clockwise) about the main rotor axis A, opposite to the first direction (i.e., counter-rotating rotors). Each of the upper rotor assembly 11 and the lower rotor assembly 13 includes a plurality of rotor blades 24 secured to a rotor hub 26.

The secondary rotor system 18 is located at the tail 16 and includes a propeller 19 with a plurality of propulsor blades 15 and an auxiliary or propulsor gear module 18T operably coupled to the engines by a propulsor drive shaft 21. A prop take-off portion 22 of the MGB 20 is connected to the propulsor drive shaft 21 and is an output gear of the MGB 20 to drive the propulsor gear module 18T and rotate the propeller 19 to generate thrust. In the illustrated embodiment, the main gearbox 20 transfers power from the engines to the main rotor system 12 and the secondary rotor system 18. Although a particular helicopter configuration is illustrated and described in the disclosed embodiment, other configurations and/or machines, such as high speed compound rotary-wing aircraft with supplemental translational thrust systems, dual contra-rotating, turbo-props, tilt-rotors tilt-wing aircraft and non-aircraft applications such as wind turbines or any application with a critical bearing of the configuration described herein will also benefit here from.

Figure 2:
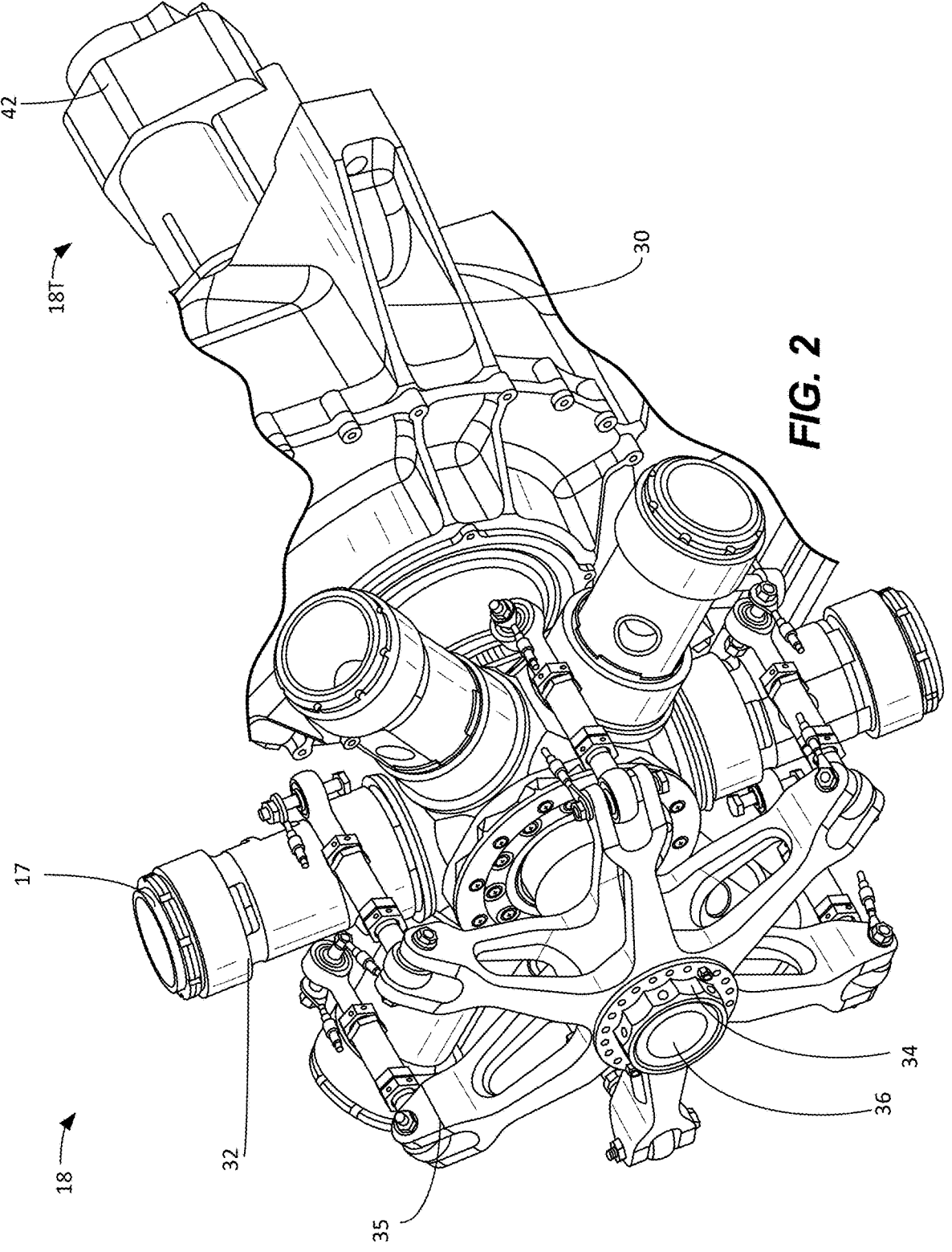
FIG. 2 depicts a perspective view of a gear module of a secondary rotor system of the rotary wing aircraft of FIG. 1.
Figure 3:
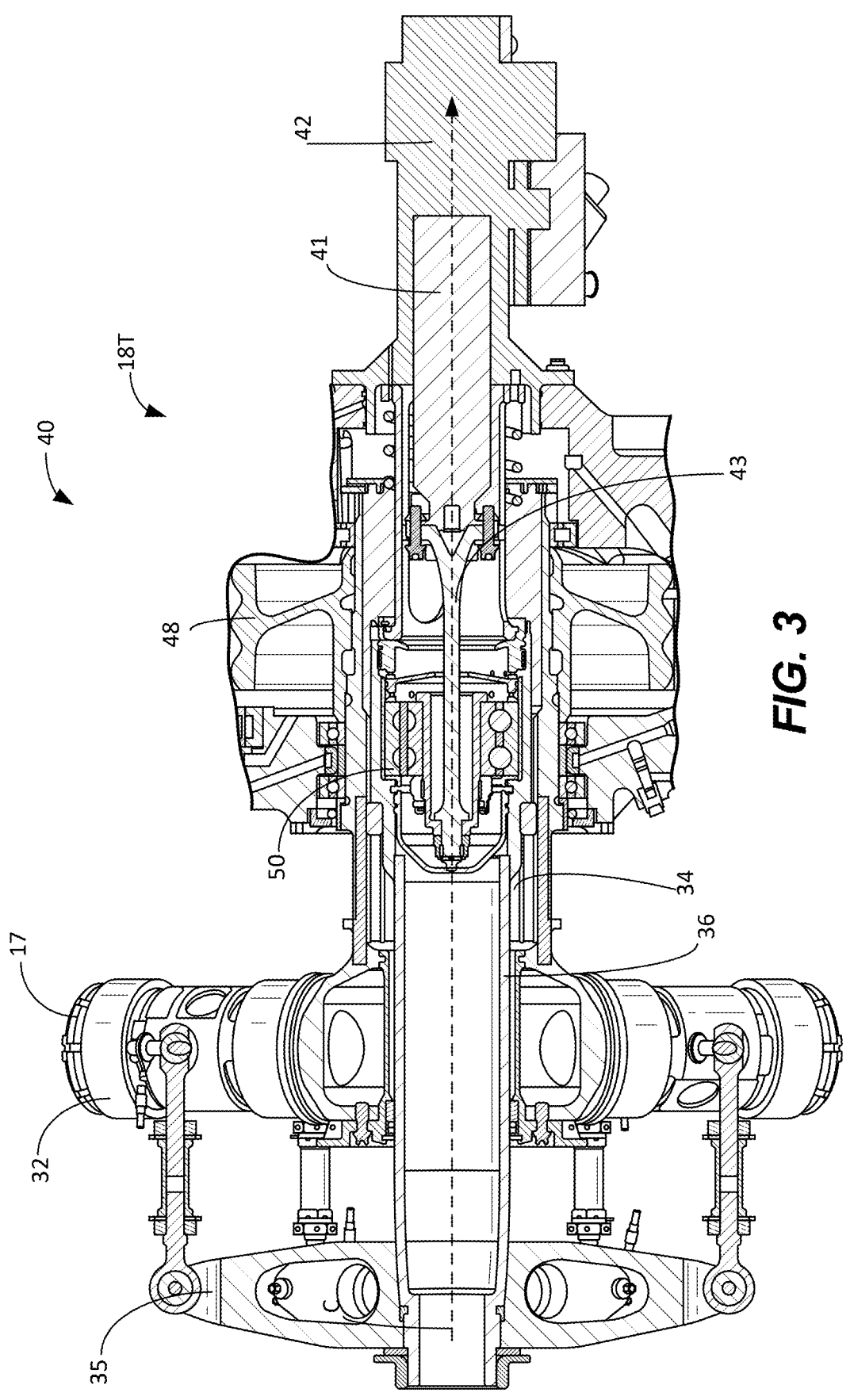
FIG. 3 depicts a cross-sectional view of the gear module of FIG. 2.

FIGS. 2 and 3 illustrate the secondary rotor system 18 according to one embodiment and including a gear module 18T driven by the main gearbox 20. The gear module 18T generally includes a housing 30, a propulsor rotor 32 having six blades mounted thereon at a mounting location 17, a rotor drive shaft 34, propulsor controls 35, a pitch change shaft 36, a drive gear (not shown), a pitch change assembly 40 and a pitch change servo 42. The secondary rotor system 18 and the rotor drive shaft 34 are each supported for rotation about an axis of rotation C. In the present embodiment, the rotor drive shaft 34 is integral with the propulsor rotor 32, but in other embodiments the rotor drive shaft 34 and the propulsor rotor 32 may be separate pieces. The drive gear engages a shaft gear 48 to rotate the rotor drive shaft 34 and the attached propulsor rotor 32. The pitch change shaft 36 rotates with the rotor drive shaft 34 about the axis of rotation C, but serves no significant power transmission function. In some embodiments, the gear module 18T and the pitch change assembly 40 may be used with the main rotor system 12 of the aircraft to control pitch of the rotor blades 24; however, for the purposes of this discussion we will focus on its implementation with the secondary rotor system 18.

The pitch change shaft 36 rotates with and moves linearly within the rotating rotor drive shaft 34. As shown, the pitch change assembly 40 may include a single bearing 50 that allows the pitch change shaft 36 to rotate independently of a flexible rod 43 coupled to an output shaft 41 of the servo 42. However, in other embodiments, the pitch change assembly 40 may include one or more roller bearings, including but not limited to cylindrical, tapered, spherical, or ball bearings, or any other bi-directional (push-pull) bearing arrangement. During normal operation, the bearing 50 is operational to transmit linear movement from the flexible rod 43 to the pitch change shaft 36.

An outer surface or race 57 of the bearing 50 rotates with the pitch change shaft 36 while an inner surface or race 58 of the bearing 50 is non-rotating and is coupled to the flexible rod 43 for linear movement via the servo 42. Through this engagement with the bearing 50, the tail rotor pitch change shaft 36 slides along the axis of rotation C in response to actuation of the servo 42 to change the pitch of the propulsor rotor 32 and the propulsor blades 15 attached thereto and thus reduces or increases the thrust of the secondary rotor system 18. This adjustment in the propulsor blade 15 pitch is configured to control forward and reverse thrust of the aircraft. In embodiments in which an anti-torque system is used, an adjustment in the blade 15 pitch may instead control a turning direction of the aircraft.

The pitch change assembly 40 may further include a sliding torsion bushing 199 that co-axially supports the pitch change shaft 36 within the rotor drive shaft 34 and rotationally locks the pitch change shaft 36 relative to the rotor drive shaft 34. The sliding torsion bushing 199 may be configured to allow the pitch change shaft 36 to rotate with the rotor drive shaft 34 while allowing for the pitch change shaft 36 to transmit linearly within the rotor drive shaft 34.

In the illustrated, non-limiting embodiment, the bearing 50 is an assembly formed from two bearings stacked together. However, a bearing 50 having any number of bearings, including a single bearing, two bearings, or more than two bearings are also contemplated herein. The bearing 50 includes a first end 132 and a second end 134. As shown, the bearing 50 includes a first rolling element row 54 and a second, substantially identical rolling element row 56 stacked along an axis of the flexible rod 43. An outer race 57 of the first and second roller bearings 54, 56 is coupled to an inner surface 59 of the rotatable pitch change shaft 36. The bearing 50 may be mounted to the flexible rod 43. It should be understood that any suitable type of bearing is considered within the scope of the disclosure.

Although the rolling elements 62 of each of the bearings 54, 56 are illustrated as ball bearings, it should be understood that any suitable rolling element is within the scope of the disclosure. In an embodiment, the number of rolling elements 62 associated with the bearing 50 may be different to produce a different acoustic or vibration frequency, for purposes of fault-diagnostic capability. Alternately, the number of rolling elements 62 may be different for different loading conditions or other design constraints and/or considerations.

Figure 4:
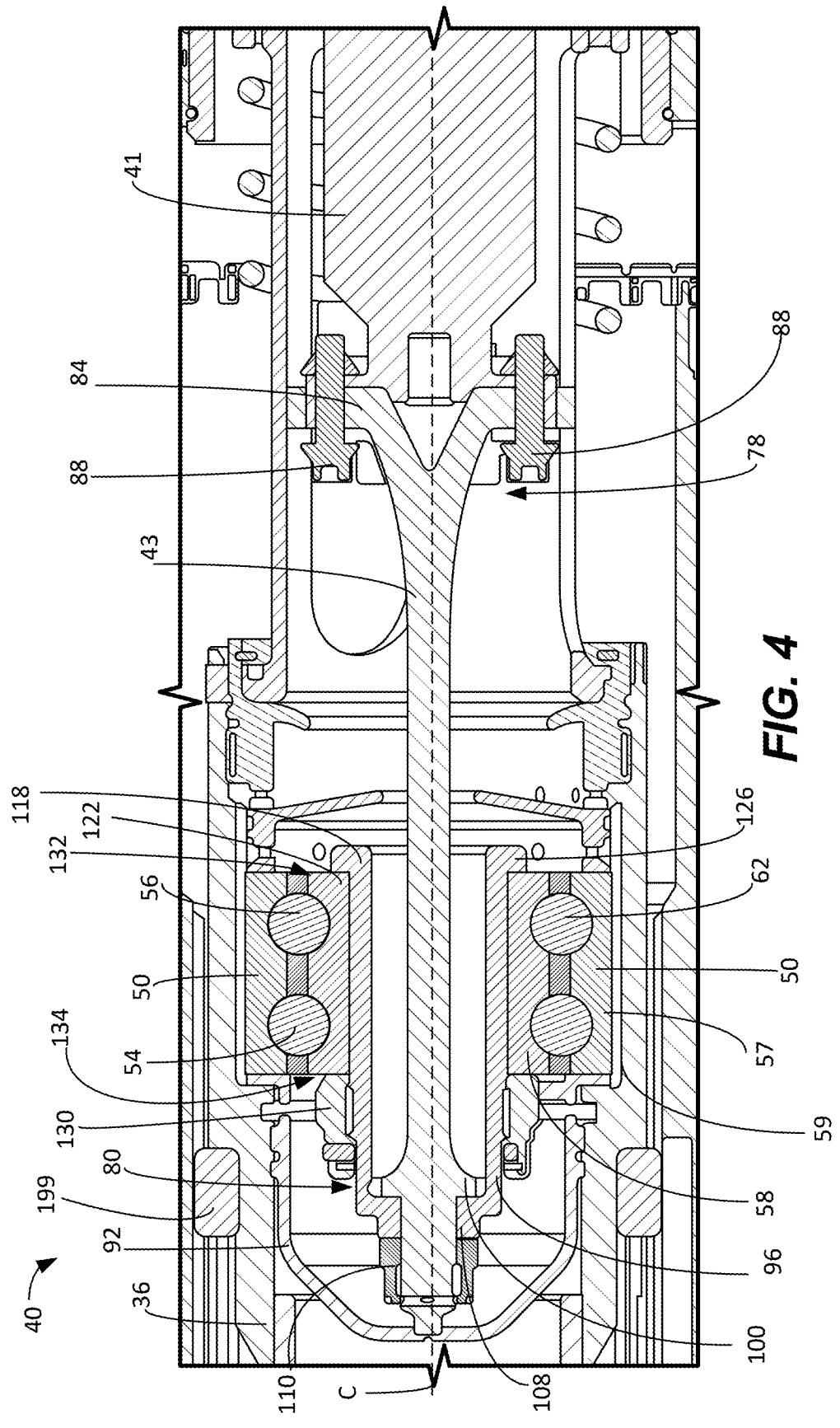
FIG. 4 depicts a cross-sectional view of a pitch change assembly of the gear module of FIG. 2.

Shown in FIG. 4 is a close-up cross-sectional view of the pitch change assembly 40 including the flexible rod 43. The flexible rod 43 has a thin outer diameter, allowing for radial deflection and misalignment during operation. In other words, the flexible rod 43 serves as a living hinge or spring within the pitch change assembly 40. The flexible rod 43 is movable along the axis C and includes a first end 78 and a second end 80. The first end 78 of the flexible rod 43 includes a large diameter plate 84. The plate 84 is fixedly coupled with the output shaft 41 of the servo 42 via a plurality of fasteners 88. In the illustrated embodiment, the fasteners 88 are bolts; however, the fasteners could be any type of fastener (e.g., screw, etc.). The plate 84 is fixedly coupled with the output shaft 41 to provide continuous linear positioning and linear motion capability while the flexible rod 43 is experiencing deflection.

The second end 80 of the flexible rod 43 is disposed within a portion of the rotating pitch change shaft 36. Additionally, an oil dam 92 is disposed between the second end 80 of the flexible rod 43 and the rotating pitch change shaft 36. Specifically, the oil dam 92 surrounds the second end 80 and is partially disposed within the pitch change shaft 36 to prevent oil used for lubricating the bearing 50 from entering the pitch change shaft 36.

The second end 80 of the flexible rod 43 is configured to receive a first fastening mechanism 110. In the illustrated embodiment, the first fastening mechanism 110 is a nut threaded to the second end 80. In other embodiments, the first fastening mechanism 110 may be a retaining ring configured to handle axial loading along axis C or any other fastener of the like. The second end 80 of the flexible rod 43 further includes a shoulder 100. The shoulder 100 abuts a bearing shaft 96 that operably couples the bearing 50 and the flexible rod 43. The bearing shaft 96 is disposed between the oil dam 92 and the second end 80 of the flexible rod 43. The bearing shaft 96 is cylindrical in shape and includes an inner diameter portion 118 and an outer diameter portion 122. The inner diameter portion 118 surrounds the shoulder 100 and a portion of the second end 80 of the flexible rod 43. The bearing shaft 96 further includes a small diameter end 108 that abuts the shoulder 100 on a first side and abuts the first fastening mechanism 110 on a second side and acts as the diametral pilot or positioning feature on the second end 80 of the flexible rod 43. In other words, the bearing shaft 96 is held in place axially with respect to the flexible rod via the shoulder 100 and the first fastening mechanism 110.

The outer diameter portion 122 of the bearing shaft 96 is coupled with the inner race 58 of the bearing 50. In the illustrated embodiment, the bearing shaft 96 includes an outer shoulder 126 that abuts the inner race 58 of the bearing 50. The outer diameter portion 122 of the bearing shaft 96 is configured to receive a second fastening mechanism 130. The second fastening mechanism 130 is a nut threaded to the outer diameter portion 122 of the bearing shaft 96. In other embodiments, the second fastening mechanism 130 may be a retaining ring or any other fastener of the like. Accordingly, the inner race 58 of the bearing 50 abuts the outer shoulder 126 of the bearing shaft 96 on the first end 132 and abuts the second fastening mechanism 130 on the second end 134. In other words, the inner race 58 of the bearing 50 is axially coupled to the bearing shaft 96 via the second fastening mechanism 130 and the outer shoulder 126.

During normal operation, shown in FIG. 3, the servo 42 moves the flexible rod 43 linearly along its axis C. Axial movement of the flexible rod 43 is transmitted to the first and second bearings 54, 56 of the bearing 50 via engagement of the first fastening mechanism 110 and the second fastening mechanism 130. Because the outer race 57 of the first and second bearing 54, 56 is coupled to the pitch change shaft 36, this axial movement of the bearings 54, 56 is transmitted to the pitch change shaft 36 thereby twisting the blades 15 about their individual axes to change the blade 15 pitch.

Various features and advantages of the embodiment described herein are set forth in the following claims.

What is claimed is:

1. A rotary-wing aircraft comprising:
a main rotor gearbox;
a main rotor system rotatable about a first axis to provide lift; and
a secondary rotor system rotatable about a second axis different from the first axis, the secondary rotor system comprising,
a gear module driven by the main rotor gearbox, the gear module including,
a servo having an output shaft linearly moveable along the second axis,
a rotating pitch change shaft that rotates about the second axis,
a pitch change assembly for coupling linear movement of the output shaft to rotational movement of the pitch change shaft, the pitch change assembly including,
a flexible rod movable along the second axis, the flexible rod-including a first end having a plate fixedly coupled with the output shaft and a second end operably coupled with the pitch change shaft, the second end disposed within the rotating pitch change shaft, and
a bearing having a rotational outer surface coupled for rotation with the pitch change shaft and a non-rotating inner surface operably coupled with the flexible rod for linear movement; and
rotor blades which rotate about the second axis to provide thrust and whose pitch is changed about a third axis according to motion of the pitch change shaft.

2. The rotary-wing aircraft of claim 1, further comprising a bearing shaft surrounding the second end of the flexible rod.

3. The rotary-wing aircraft of claim 2, wherein the bearing shaft is coupled to the second end of the flexible rod by a first fastener.

4. The rotary-wing aircraft of claim 2, wherein the bearing shaft includes an outer diameter portion coupled with the inner surface of the bearing by a second fastener.

5. The rotary-wing aircraft of claim 1, further comprising an oil dam surrounding the second end of the flexible rod.

6. The rotary-wing aircraft of claim 1, wherein the plate is coupled with the output shaft by a plurality of fasteners.

7. The rotary-wing aircraft of claim 1, wherein the flexible rod has a thin outer diameter, allowing for deflection during operation.

8. The rotary-wing aircraft of claim 1, wherein the bearing allows the pitch change shaft to rotate independently of the flexible rod.

9. A rotor system for use in a rotary-wing aircraft, the rotor system comprising:

a gear module driven by a rotor gearbox, the gear module including, a servo having an output shaft linearly moveable along an axis, a rotating pitch change shaft which rotates about the axis, a pitch change assembly for transforming linear movement of the output shaft to rotational movement of the pitch change shaft, the pitch change assembly including, a flexible rod movable along the axis, the flexible rod including a first end having a plate fixedly coupled with the output shaft and a second end operably coupled with the pitch change shaft, and a bearing having a rotational outer surface coupled for rotation with the pitch change shaft and a non-rotating inner surface operably coupled with the flexible rod for linear movement, wherein the bearing is the only bearing in the pitch change assembly; and rotor blades which rotate about the axis and whose pitch is changed according to motion of the pitch change shaft.

10. The rotor system of claim 9, further comprising a bearing shaft surrounding the second end of the flexible rod.

11. The rotor system of claim 10, wherein the bearing shaft is coupled to the second end of the flexible rod by a first fastener.

12. The rotor system of claim 10, wherein the bearing shaft includes an outer diameter portion coupled with the inner surface of the bearing by a second fastener.

13. The rotor system of claim 9, wherein the bearing is operational to transmit linear movement from the flexible rod to the pitch change shaft.

14. The rotor system of claim 9, further comprising an oil dam surrounding the second end of the flexible rod.

15. The rotor system of claim 9, wherein the plate is coupled with the output shaft by a plurality of fasteners.

16. The rotor system of claim 9, wherein the bearing supports the pitch change shaft in a manner that allows that pitch change shaft to rotate independently of the flexible rod.

17. A gear module comprising:

a servo having an output shaft linearly moveable along an axis;

a rotating pitch change shaft which rotates about the axis, a pitch change assembly for coupling linear movement of the output shaft to rotational movement of the pitch change shaft, the pitch change assembly including, a flexible rod movable along the axis, the flexible rod including a first end having a plate fixedly coupled with the output shaft by a plurality of fasteners and a second end, a bearing shaft surrounding a portion of the flexible rod, the bearing shaft coupled with the second end of the flexible rod by a first fastener, and a bearing having a rotational outer surface coupled for rotation with the pitch change shaft and a non-rotating inner surface operably coupled with the flexible rod for linear movement, wherein an outer diameter portion of the bearing shaft is coupled with the inner surface of the bearing by a second fastener.

18. The gear module of claim 17, wherein the plate imparts a moment on the output shaft.

19. The gear module of claim 17, wherein the bearing includes a first roller bearing and a second roller bearing stacked along an axis of the flexible rod.

20. The gear module of claim 17, wherein the bearing supports the pitch change shaft in a manner that allows that pitch change shaft to rotate independently of the flexible rod.

* * * * *